United States Patent [19]

Kleimenhagen et al.

[11] 4,214,860
[45] Jul. 29, 1980

[54] APPARATUS FOR BLOW MOLDING HOLLOW ARTICLES, IN PARTICULAR BOTTLES

[75] Inventors: Günter Kleimenhagen; Otto Rosenkranz; Peter Albrecht, all of Hamburg; Hans Conow, Hamburg-Norderstedt; Holger Köther, Hamburg; Dieter Schmidt, Hamburg; Klaus Vogel, Hamburg, all of Fed. Rep. of Germany

[73] Assignee: Gildemeister Corpoplast, Hamburg, Fed. Rep. of Germany

[21] Appl. No.: 943,715

[22] Filed: Sep. 19, 1978

[30] Foreign Application Priority Data

Sep. 6, 1978 [DE] Fed. Rep. of Germany ....... 2742693

[51] Int. Cl.² ............................................. B29C 17/07
[52] U.S. Cl. .................................... 425/149; 425/526; 425/529; 425/534; 425/540
[58] Field of Search ........ 425/526, 529, 534, 538–540, 425/149; 264/532, 535

[56] References Cited

U.S. PATENT DOCUMENTS

| 3,599,280 | 8/1971 | Rosenkranz et al. | 425/526 X |
| 4,070,428 | 1/1978 | Krall et al. | 425/534 X |
| 4,141,680 | 2/1979 | Kauffman et al. | 425/526 X |

*Primary Examiner*—Jan H. Silbaugh
*Attorney, Agent, or Firm*—Remy J. VanOphem

[57] ABSTRACT

An apparatus to make articles, in particular bottles, from parisons in a blow mold operation. The parisons are carried on transfer mandrels throughout the operation. The parisons riding on the transfer mandrels are heated while travelling around on a first wheel and are transferred into blow mold units mounted on a second wheel. Each blow mold unit is provided with an expanding mandrel which is extended through the transfer mandrel into the parisons. Two different blowing pressures are used in the blowing step which is controlled by cam controlled valves. From the second wheel the mandrels carrying the blown articles are transferred to an output wheel where the articles are removed from the transfer mandrels which are returned to the first wheel.

13 Claims, 17 Drawing Figures

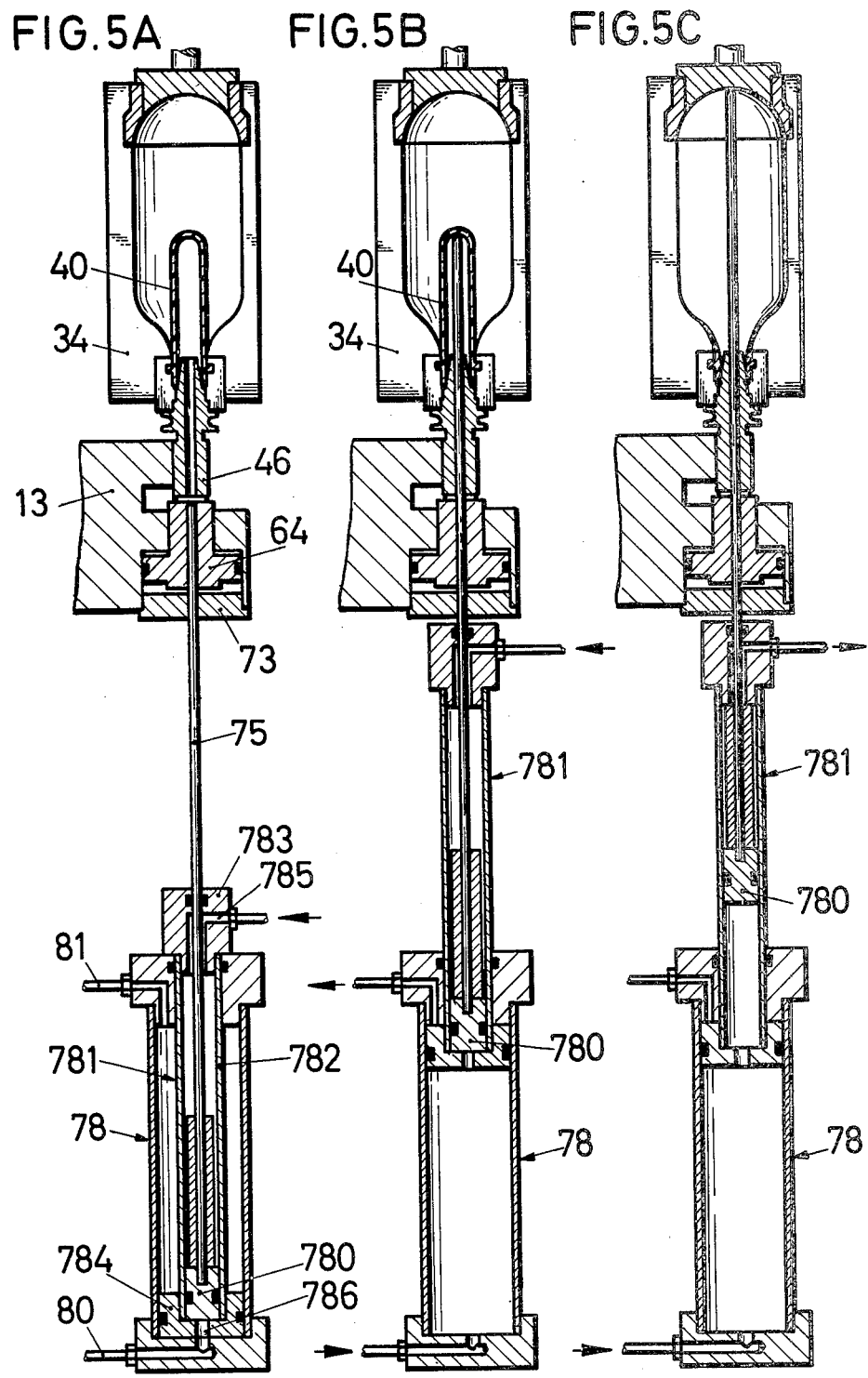

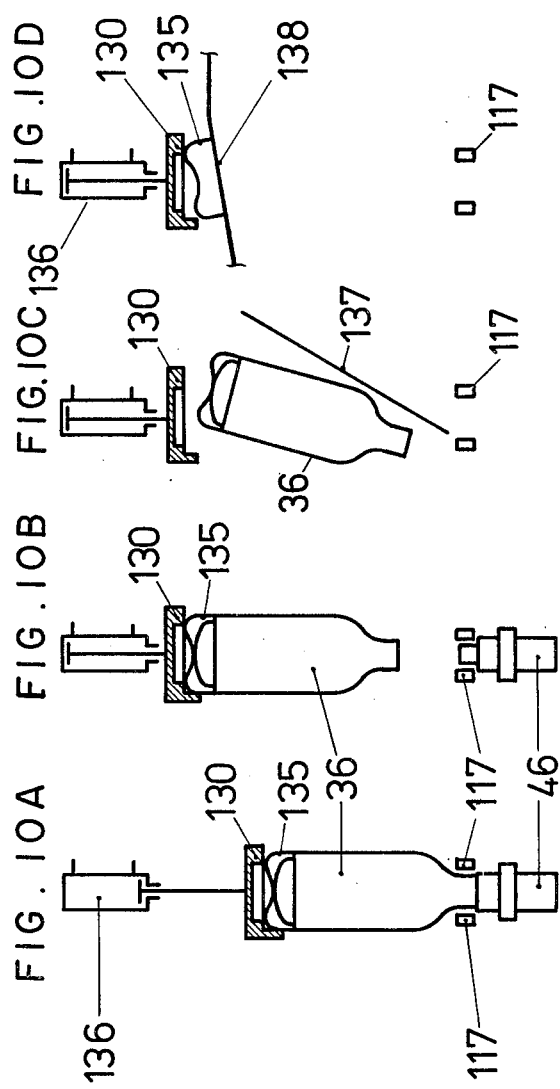

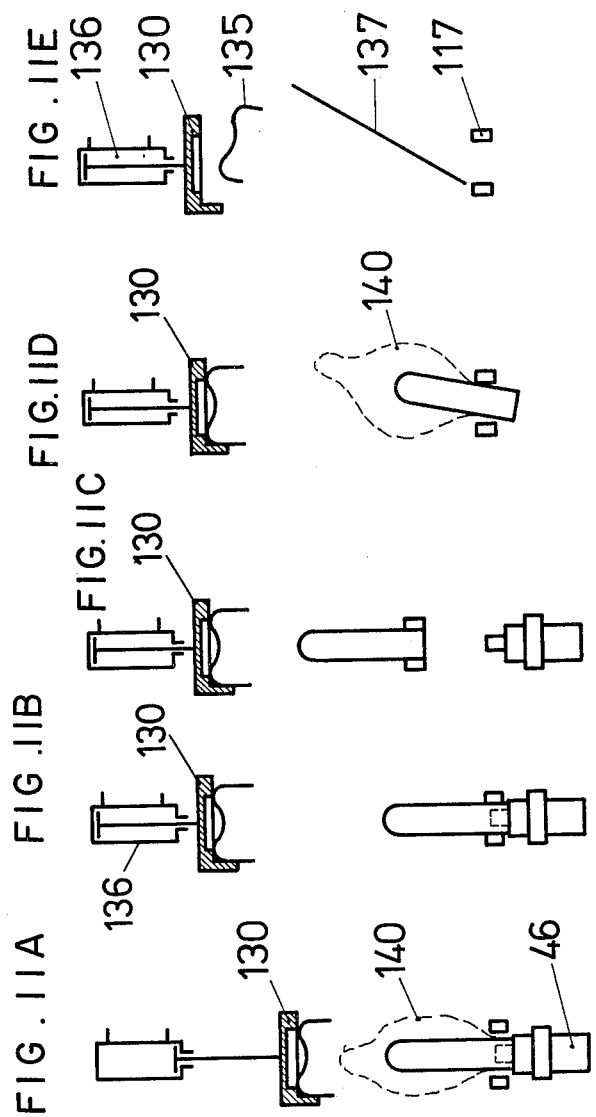

APPARATUS FOR BLOW MOLDING HOLLOW ARTICLES, IN PARTICULAR BOTTLES

BACKGROUND OF THE INVENTION

1. Field of the Invention

The invention relates to an apparatus for blow-molding hollow articles, in particular bottles, made of thermoplastic material. The apparatus comprises a rotatably driven rotary heating member, a plurality of parison carrying mandrels, means to hold and transport said mandrels at the periphery of the rotary heating member, an input station for feeding parisons, heating means to heat the parisons to a blowable temperature, a rotatably driven rotary blowing member including a plurality of blow molds, a transfer station between the rotary heating member and the rotary blowing member and an output means to remove the finished articles, wherein the longitudinal axis of said parisons extend parallel with respect to the rotary axis of both rotary members.

2. Description of the Prior Art

A machine of this type in which all individual rotary members are continuously driven has been suggested in German Patent No. 1 704 119. According to this proposal a first rotatable table is disclosed carrying means to make parisons having a closed bottom portion and a finish at the opening for later receiving a closure. On the table, tube-like portions are gripped intermediate their ends which are heated to welding temperature. For closing the bottom and shaping the finish the tube is then held at a blowing mandrel, having a forward end defining a die core to close the bottom and further including a movable annular die member to shape the finish of the bottle. The blowing mandrel carrying the ready parison is then transferred to the heating table where it is heated along its length to a blowing temperature and is subsequently blown into the hollow article while being carried on a blowing table where the lower ends of the blowing mandrels are connected to a blowing medium pressure source.

Thus the blowing mandrel of this machine allows for performing a number of steps such as to supply blowing medium to the parison and further to shape the parison in closing the bottom portion and forming the opening. This results in a relatively complex structure which weighs the more as all the parisons circulating in the apparatus have to be carried by the blowing mandrels. Accordingly, this necessitates a very large number of blowing mandrels. Further the known type of mandrel does not allow to center and to expand the parison during the blow mold step. In particular, expanding the parison is a desirable feature to gain a biaxial orientation of the plastic material by axially expanding the parison during blowing to obtain an increased rigidity of the finished article.

After blowing the article in the known machine the blow mold is opened and the bottom of the article engaged by a vacuum bell to draw off the article from the blowing mandrel. This operation takes place at the blowing table so that subsequently the blowing mandrels are returned directly onto the first table which is the parison shaping table, while the articles are carried to an output conveyor. However, in case where an article is burst or cracked the vacuum bell cannot attract the article bottom so that the blowing mandrel including the waste has to be removed. This is the reason for providing an additional feeding station for blowing mandrels at the parison shaping table to replace blowing mandrels which had to be disposed. This renders the structure still more complex.

German Patent No. 2 141 249 discloses a further embodiment of a blowing mandrel allowing to centering and expanding the parison during the blow mold step. The end of the blowing mandrel extending into the parison carries a piston-like sleeve which is displaced by the blowing pressure to axially guide and expand the parison. The blowing medium enters the parison through a throttling section between the mandrel end and the sleeve. This type of mandrel is expensive to manufacture.

Nevertheless the known machine offers many advantages to blow mold great numbers of articles, in particular due to a continuous operation. For example this would be not possible in a machine operating step by step.

SUMMARY OF THE INVENTION

One object of the present invention is to improve a continously operating apparatus to substantially simplify the structure of the mandrel and to improve the blowing and expanding operation. A further object is to return the mandrels from the blowing table to the heating table in a very simple and reliable manner to avoid an additional feeding station for mandrels.

Accordingly the invention provides a rotary blowing member incorporating a plurality of expanding mandrels which are displaceable parallel to the rotary axis of the rotary member which expanding mandrels may be passed through a central bore of a transfer mandrel into the parison after the latter which is carried on the transfer mandrel has been transferred from the rotary heating member onto the rotary blowing member on which the parison has been enclosed in a blow mold device. After opening the blow mold the transfer mandrel carrying the finished article is transferred to a rotary output member which is located between the rotary blow member and the rotary heating member, said output member including means to separate the article from the transfer mandrel.

Accordingly the apparatus according to the invention receives preshaped parisons having a closed bottom and a bottle finish. Parisons of this type may be produced by die molding, by an extruding step or in any other known manner.

A unique feature of the apparatus according to the invention is to be seen in the fact that the circulation of a blowing mandrel is avoided which mandrel has to be designed to fulfill a plurality of relatively complex objects, whereas now according to the invention a transfer mandrel of a very simple structure carries the parisons around.

According to the invention the transfer mandrel is circulated through the complete apparatus. After slipping a parison on a transfer mandrel being carried on the rotary heating member the parison is rotated about its longitudinal axis by a cord drive travelling past the heating means. The parison is heated to the temperature of orientation i.e. blowing temperature to allow for biaxial orientation, wherein a predetermined temperature gradient is obtained in the axial extension of the parison to control the wall thickness of the article to be blown in the subsequent step.

The transfer mandrel is defined to receive only the finish portion of the parison. Thus the infrared radiation may freely penetrate the parison with no structures being within the parison which could reflect or absorb the radiation. A substantial improvement of the inventive transfer mandrel is further seen in the freeness of any obstruction with respect to the radiation. Following the heating means the rotary heating member provides for a temperature equalizing distance allowing for a fine levelling of the temperature across the wall thickness of the parison.

Upon passing over the transfer mandrel from the rotary heating member to the blowing member and after closing the blow mold sections an expanding means mounted on the rotary blowing member and actuated therefrom is displaced through a central bore of the transfer mandrel into the parison to provide for a guiding and expanding function. Both the transfer mandrel and the expanding means define a blowing mandrel in that the blowing medium may now be supplied through the annular space between the expanding mandrel and the central bore of the transfer mandrel.

Preferably, the expanding mandrel is moved by an air cylinder having a piston whose speed and force may be controlled and adjusted. Preferably the air cylinder is controlled by a rotary valve in response to rotating distance or, respectively responsive to time. More particularly, the expanding mandrel is displaced to be close below the bottom of the parison at the beginning of the blowing step to enable the expanding mandrel to immediately expand and centrally guide the bubble in initiating the blow mold step.

A further distinct embodiment of the expanding mandrel is obtained by a telescopic type air cylinder. Accordingly in a first step the expanding mandrel is displaced closely below the bottom of the parison to improve the proper positioning of the mandrel irrespective of air pressure and friction.

In the second stage the expanding mandrel directly follows the bubble to be blown into the article. The expanding force is controlled externally through the pressure. The motion may be initiated by a fixed program of a rotary valve or by a valve controlled by the blowing pressure.

Further advantages result from controlling the blowing pressure which is provided by means of valves which are actuated by adjustable stationary cam faces. Thus performing the blowing operation may be simply controlled by adjusting or replacing said cam faces. The blowing and expanding operation is not determined by the structural features of the blowing mandrel. Therefore a wide variety of programs may be performed, wherein the expanding and the blowing steps are controlled separately. This leads to a greatly improved adaptability of the apparatus accompanied by a substantially less complexity.

According to a preferred embodiment of the invention the blowing air is supplied at different pressure levels, wherein the pressure and the blowing time are adjustable by control means. Furthermore the amount of flow for each pressure level is externally adjustable for each blowing station.

Means are provided to supply for example a second blowing pressure in response to the internal pressure obtained in the parison by the blowing pressure of the first blowing stage, instead of controlling the second blowing pressure by a cam-controlled valve.

In contrast to the prior art in which the separation of the article and the blow mandrel takes place within the blow mold device, the invention provides for a rotary output member which is located in the nip between the rotary blowing member and the rotary heating member and which is provided with arms which conduct an accelerating motion after opening the blow mold sections to grip the article to be carried on the transfer mandrel and to remove this unit out of the gap between the blow mold sections. Subsequently the article is drawn off the transfer mandrel, is then held by a vacuum bell and carried to an output station, whereas the transfer mandrel still engaged by the output member is directly returned to the rotary heating member. Where a transfer mandrel carries a cracked or burst article which cannot be attracted by the vacuum bell the article is rejected after being removed from the transfer mandrel. This operation of the rotary output member results in the advantage that all transfer mandrels are directly returned to the rotary heating member. Furthermore, the articles are automatically classified into proper and waste articles.

If articles adapted for high internal pressure are blown where the bottom is convex and which cannot stand upright, the article may be provided with a stand ring on the rotary output member. This is possible by providing some simple additional means to the rotary output member.

As far as the air pressure admission to the expanding and blow means are not controlled externally through valves and cam means according to a variable program all further air cylinders operable with the rotary blowing member and the rotary output member are supplied with pressure medium by means of rotary valves which are rotating with the rotary members and through which annular grooves the beginning and ending of the air admission and exhaust is determined. Those rotary valves are disclosed in German Patent No. 1 704 119. Since the rotary heating member accommodates a large number of transfer mandrels and the rotary blowing member a considerably smaller number of blow mold units the transfer member between both rotary members and the output member must be rotated to compensate for the different peripheral spaces of the transfer mandrels on the heating member and the blowing member. This is obtained by pivotally mounted arms which receive an acceleration or deceleration during rotation of the transfer member or the output member in that the arms are positively driven by a cam means to conduct an advancing or trailing pivotal motion with respect to the rotational speed. Holding the transfer mandrels to the rotary members takes place by permanent magnets inserted at the periphery of the members. To transfer a mandrel from one member to the next member additional guide means are provided.

The rotary heating member of the apparatus according to the invention provides preferably for 36 transfer mandrels and the rotary blowing member for 6 blow mold units, wherein the rotary output member has 8 transfer arms. All the rotary members being continuously driven the apparatus is adapted to blow mold 2000 to 3000 units per hour.

BRIEF DESCRIPTION OF THE DRAWINGS

The invention will now be described more fully with reference to the drawing, which shows an embodiment of the invention.

FIGS. 10 and 11 are a schematical illustration of the operation at the rotary output member in mounting a stand ring.

DETAILED DESCRIPTION OF THE PREFERRED EMBODIMENT

Figure 1:
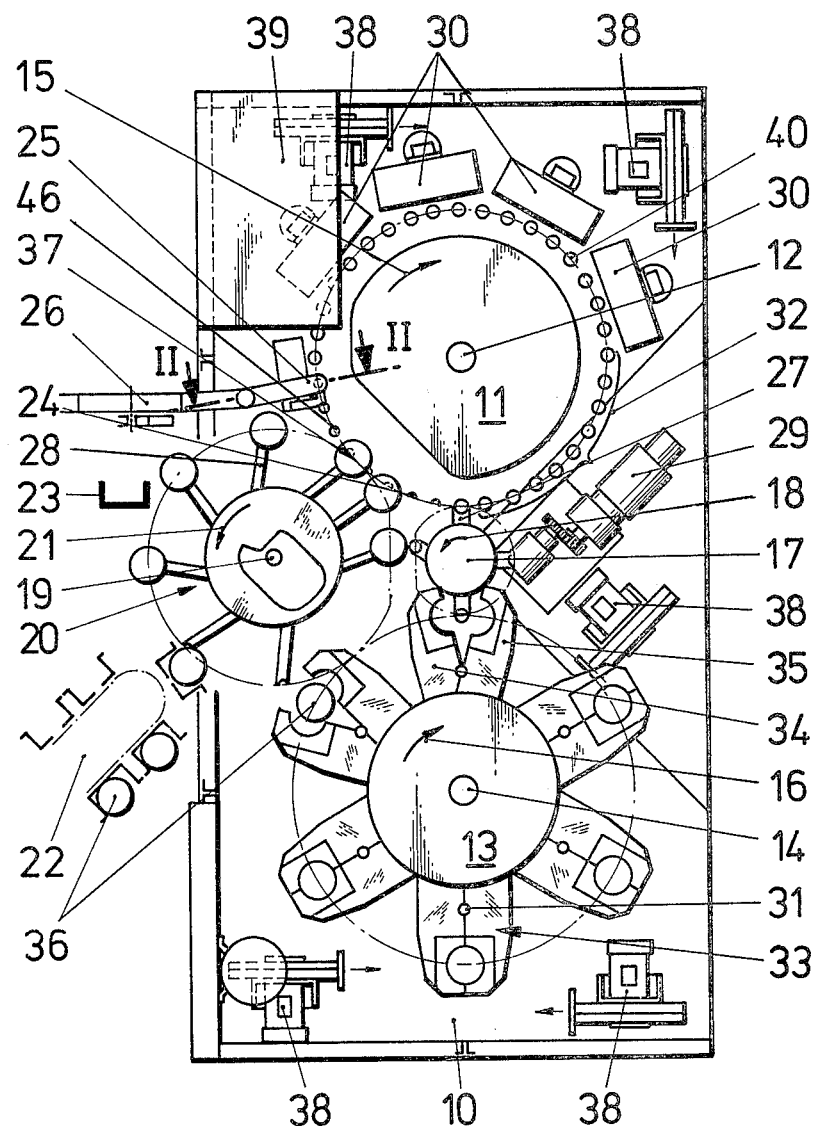
FIG. 1 is a plane view of the apparatus including the rotary heating and rotary blowing member.

FIG. 1 schematically shows a top view of the complete machine. A first rotary member 11 carrying a plurality of blanks to be heated and rotating about a vertical axis 12 and a second rotary member 13 carrying a plurality of blow molds and rotating about a vertical axis 14 are arranged side by side on a base frame 10. The arrow 15 shows the direction of rotation of the first rotary member 11 and the arrow 16 the rotational direction of the second rotary member. A transfer rotary member 17 is disposed between both rotary members 11 and 13 for receiving mandrels 46 carrying parisons 40 thereon from the rotary heating member and conveying them onto the rotary blowing member 13. Arrow 18 shows the rotational direction of the transfer wheel 17.

In the nip between the rotary heating member 11 and the rotary blowing member 13 a rotary output member 20 is located which is driven about a vertical axis 19 in the direction of the arrow 21. The hollow articles 36 still riding on the mandrels 46 after being taken from the rotary blow member 13 are removed from the mandrels on the output member 20. Subsequently, the mandrels 46 are returned onto the heating member 11, whereas the finished articles are transferred to a conveyor 22, but articles which are ruptured or unfinished go into the waste disposal 23 before reaching the conveyor.

Figure 2:
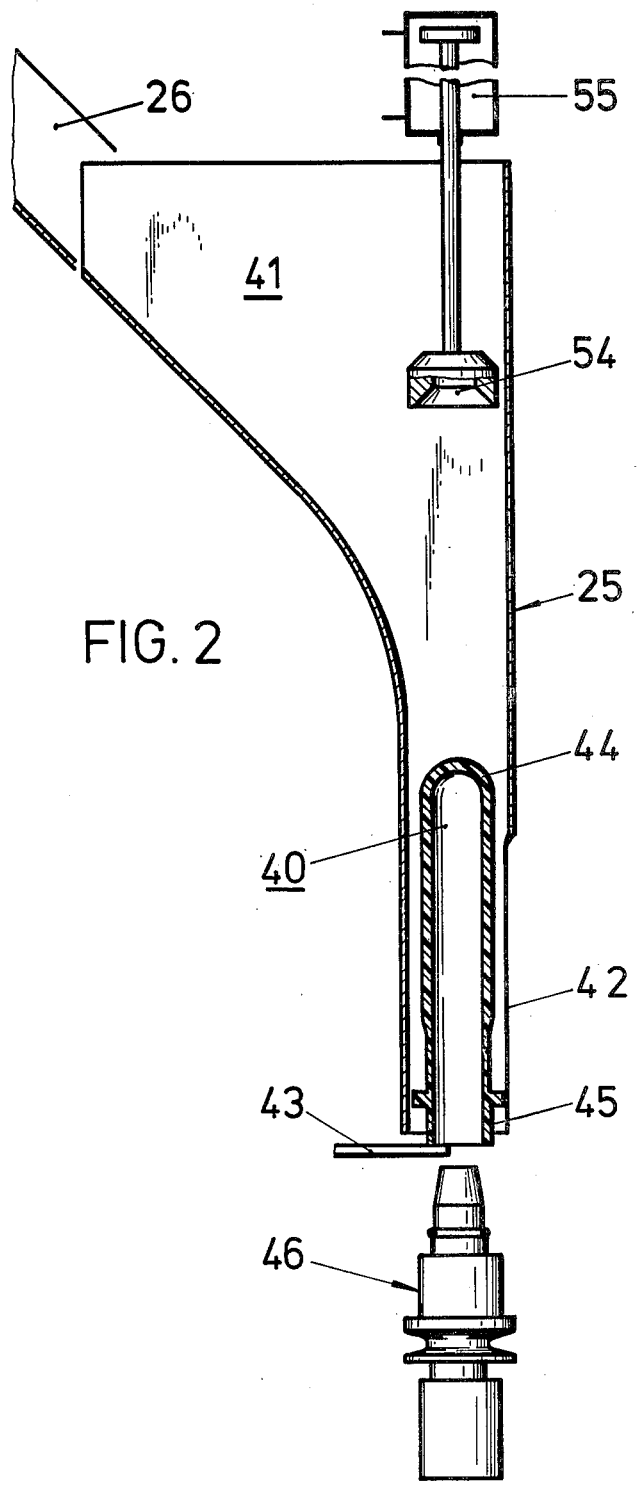
FIG. 2 is a section through the input station at the rotary heating member along lines 2-2 of FIG. 1.
Figure 4:
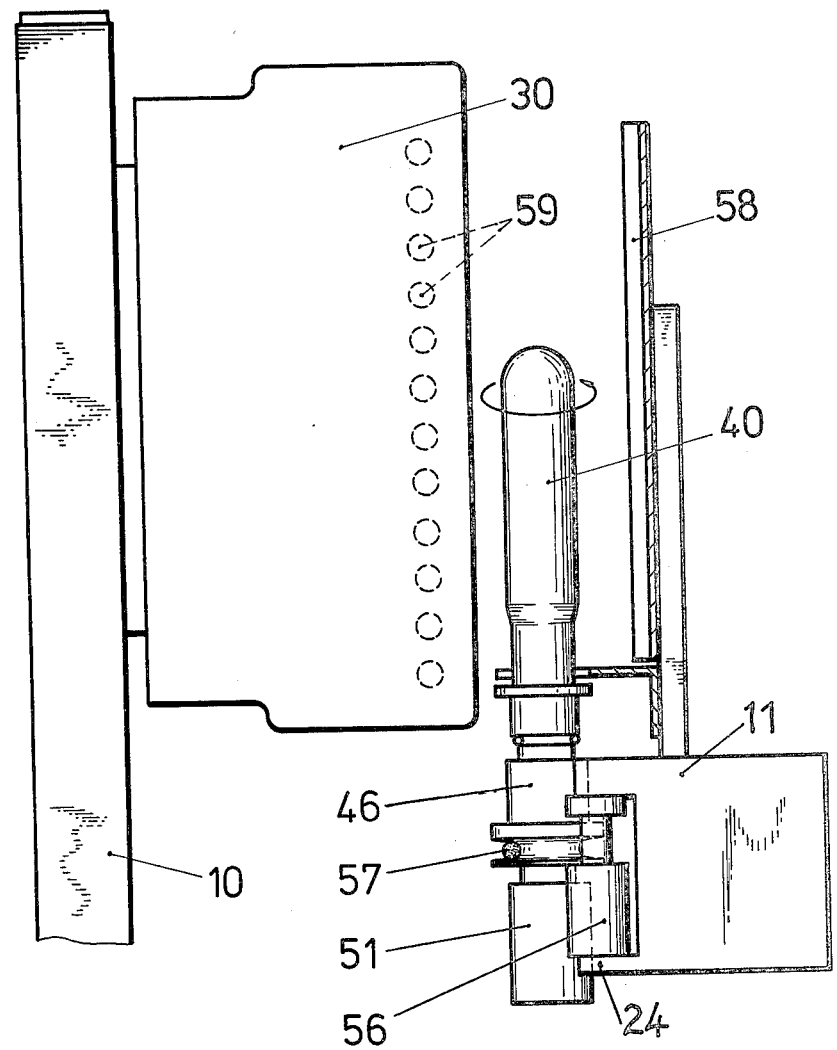
FIG. 4 is a section through the portion of the rotary heating member facing the heating means.

In spaced relationship along the periphery of the rotary heating member 11 a large number of supports 24 are provided to receive a plurality of mandrels. FIG. 4 shows this in detail. Furthermore, a feeding station 25 as shown in FIG. 2 is located at the periphery of the rotary member. The parisons are fed to the feeding station 25 by means of a conveyor 26. Following the feeding station 25 a plurality of heating means 30 is provided along the periphery of the rotary member which heating means heat the parisons riding on the mandrels by infrared radiation to a blowable temperature. While being heated the mandrels rotate about their axes. The heating is controlled such that a desired temperature distribution is obtained along the length of the parisons to control the wall thickness in the subsequent blow molding step. Thereafter the parisons travel through a distance 32 in order to facilitate equalizing the temperature across the wall thickness of each parison.

Figure 5:
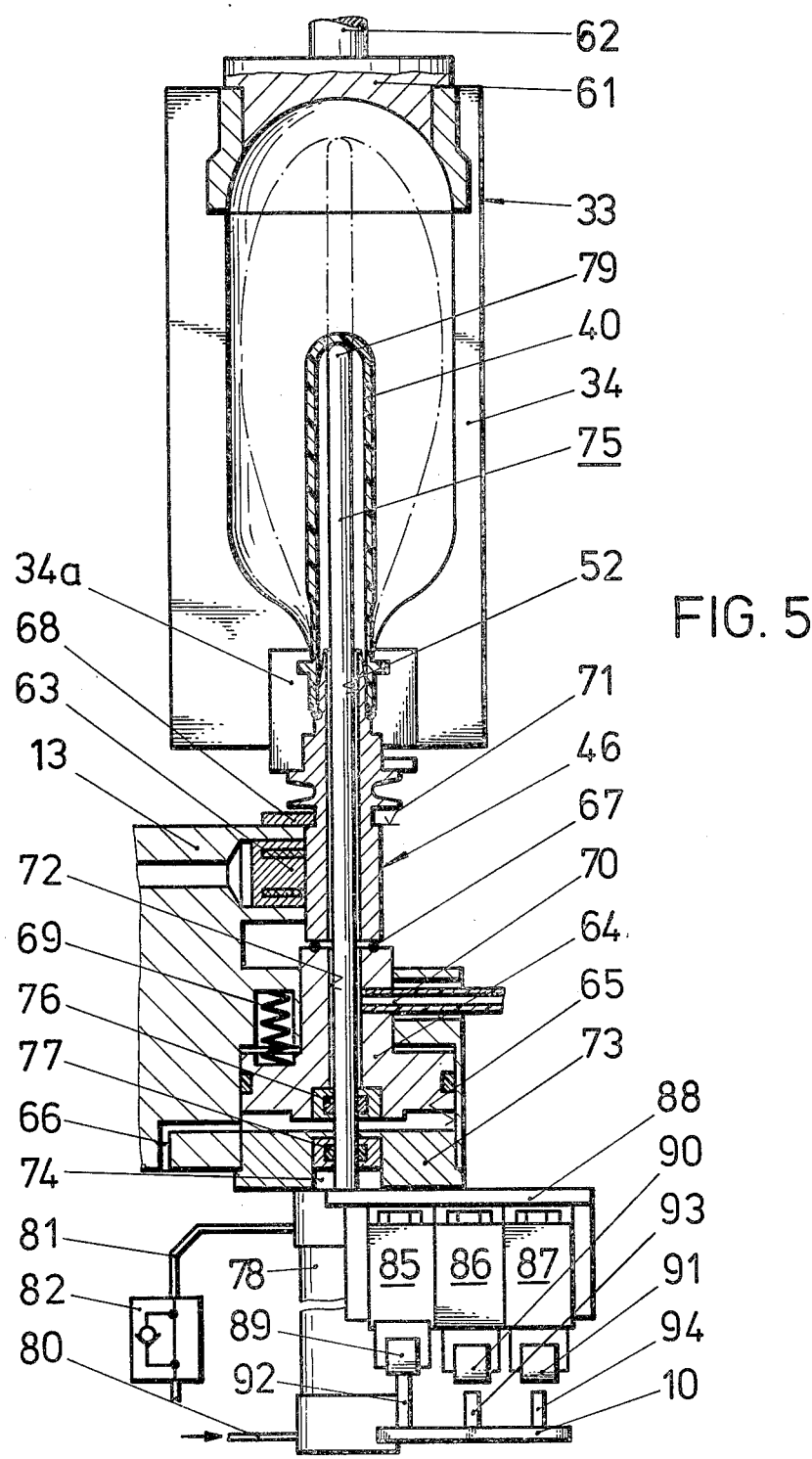
FIG. 5 is a section through a blow mold unit where a parison is inserted with the expanding mandrel in the extended position and the blowing medium connection completed, FIGS. 5A, B and C the expanding mandrel and the telescopic cylinder in three different positions.

Then each mandrel together with a parison is delivered from the transfer member 17 to the rotary blowing member 13. The latter comprises a plurality of blow molds 33 each including a pair of blow mold sections 34 and 35 which are pivoted about an axis 31 between an open position and a closed position. As soon as the blow mold sections 34 and 35 are closed after the transfer of a mandrel including a parison has been terminated a blowing medium is delivered into the parison through an expanding mandrel which guides and expands the parison in an axial direction during the blowing step. After opening the blow mold sections the finished article seated upon the transfer mandrel is taken off by the output rotary member 20. Furthermore the article 36 is drawn off the transfer mandrel and the latter is delivered to the rotary heating member at 37. Details of the rotary blowing member are shown in FIG. 5, the control means of the blowing medium in FIG. 6 and the output member in FIGS. 7,8 and 9.

The article is either delivered to the conveyor 22 or into the waste disposal 23 in case of an unfinished or broken article.

According to the preferred embodiment of FIG. 1 the rotary heating member 11 comprises thirty six supports 24 receiving the transfer mandrels 46, whereas the rotary blowing member 13 comprises only 6 blow mold devices 33. In view of this the speed of the heating member is selected six times the speed of the blowing member and this results in a change of speed at the transfer station. This change of speed takes place by means of transfer arms 27 and 28 which are mounted on the transfer member 17 and the output member 20 and which transfer arms are pivotally driven in a peripheral direction of said rotary members in order to exert an accelerating or, respectively, a decelerating motion. The transfer member 17 comprises four transfer arms 27 and the output member 20 eight transfer arms 28.

The drive means 29 including gear means driving the rotary members, cooling fans 38 and switch boards are not shown in detail. The machine is unique in respect of its compact and easily accessible arrangement. The rotary members in their cooperation are arranged in a compact manner and the operation of the machine can be easily observed when the switch board 39 is located adjacent the feeding conveyor 26 or the output conveyor 22.

All rotary members are continuously driven.

FIG. 2 schematically shows a section through the feeding station 25. A parison 40 has been delivered from a feeding chute 26 through a feeding funnel 41 into a feeding opening 42 in which the parison is stopped by a member 43. After removing the stop member 43 the parison may be seated upon a transfer mandrel 46 which is supported at the periphery of the rotary heating member 11. The parison 40 having a closed bottom 44 and a finish 45 is made according to a known process. The finish 45 has a profile which allows for mounting a bottle closure after blowing and filling the hollow article.

Figure 3:
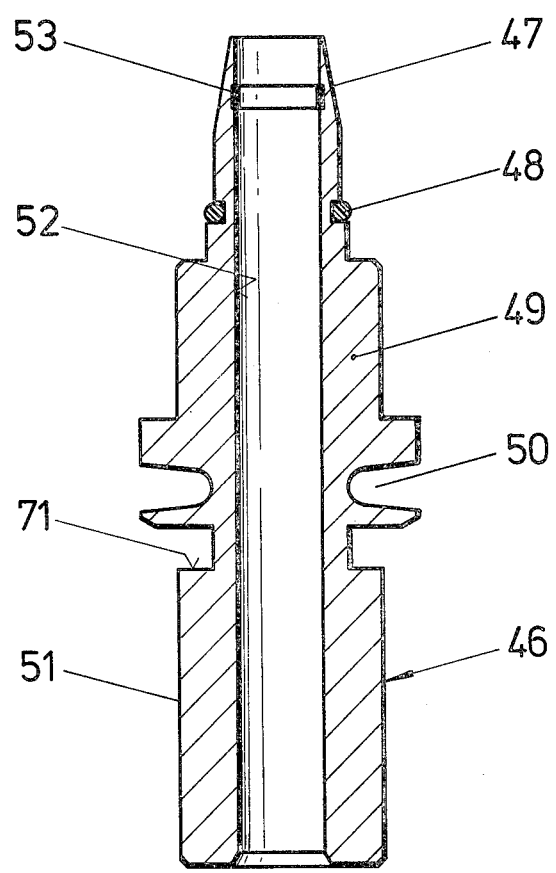
FIG. 3 is a section through a transfer mandrel.

FIG. 3 shows a section through the transfer mandrel 46. For the sake of clearness the support means holding the transfer mandrel on the rotary heating member 11 is not shown. This is rather illustrated in FIG. 4. The transfer mandrel 46 has the following shape:

The end of the transfer mandrel showing towards the finish 45 of the parison is provided with a receiving cone 47 and with a seal 48 to seal off the inner space of the parison when it is seated upon the tapered receiving section 47. Axially adjacent the mandrel body 49 there is provided an annular groove 50 which serves to rotate the mandrel while being on the rotary heating member. The opposite end of the mandrel is designed to be a cylindrical shaft 51 which serves to support the mandrel on the various rotary members and further allows the transfer mandrel to rotate on the rotary heating member. Finally the transfer mandrel has a central bore 52 to accommodate the expanding mandrel and to provide a passage for the blowing medium on the rotary blowing member.

When a transfer mandrel 46 supported on the heating member 11 enters below a parison 40 held back by the stop member 43 as shown in FIG. 2 the stop member 43 is pulled off and the parison is moved by means of a centering bell 54 onto the receiving cone 47 and in sealing contact with the annular seal 48. Movement of the centering bell 54 is initiated by actuating the piston of an overtop cylinder 55.

Referring again to FIG. 3 the upper end of the central bore 52 is provided with an annular member 53 to guide the expanding mandrel passing through the central bore.

As FIG. 4 shows, the parison 40 seating upon the transfer mandrel 46 travels past the stationary heating means 30. The shaft 51 of the transfer mandrel is magnetically held onto the rotary heating member 11. For this a permanent number of magnets not shown in FIG. 4, which are located at the rotary heating member 11, draw the shaft 51 into the nip between a pair of rotary rollers of which FIG. 4 shows the front roller 56. A stationary cord drive means 57 engages the annular groove 50 of the transfer mandrel. In this way the transfer mandrel is rotated by the rotary motion of the heating member. A reflector 58 is provided at the side of the parison opposite the heating means 30 which reflector reflects any random radiation emitted by the infra-red radiators 59. This substantially increases the life time of the infra-red radiators 59 and increases the heating efficiency. The number of radiators 59 arranged one above the other is selected with respect to its power and its distance from the parison 40 such that a desired temperature gradient is obtained along the axis of the parison to allow for controlling the wall thickness of the article to be blown in the subsequent blow molding step.

After passing the temperature equalizing path 32 shown in FIG. 1 the transfer mandrels including the heated parisons are delivered to the member 13 by the transfer member 17. Since the mechanical drive means of the transfer wheel 17 substantially corresponds to what will be explained later with respect to the output member 20 the transfer member 17 is not shown in detail.

FIG. 5 is a vertical sectional view through a blowing station of the rotary blowing member 13, wherein the parison is enclosed in the blow mold 33 with the blow mold sections in the closed position. Thus FIG. 5 shows only one blow mold section 34, the lower insert 34a thereof engaging the finish section of the parison 40. Both blow mold sections 34 and 35 are mounted on the rotary blow member 13 and may be pivoted about a vertical axis 31 shown in FIG. 1. This arrangement is well-known and thus not shown in detail. Furthermore each blow mold device includes a bottom mold section 61 which may be lowered and raised through the piston rod 62 of a cylinder mounted atop (not shown). In spaced relationship along the periphery of the rotary member 13 there are arranged magnets 63 to grip a transfer mandrel 46 each delivered from the transfer wheel 17. All the magnets for holding the transfer mandrels in their position at the rotary members are permanent magnets and the transfer is accomplished by mechanical guiding members not shown in FIG. 5. Furthermore, a piston 64 being movable in a cylinder 65 is provided below each transfer mandrel 46 in axial alignment therewith. The cylinder space below the piston 64 is supplied with a pressurized medium through the passage 66 which raises piston 64 and urges the annular seal 67 mounted thereon onto the lower end face of the transfer mandrel 46. The transfer mandrel is held against axial displacement by a stop member 68. With the cylinder 65 vented to atmosphere, the spring 69 urges the piston 64 downwardly and the transfer mandrel is free. In this position of the piston 64, the transfer mandrel carrying the parison is inserted into and removed from the blow mold. In the raised position of the piston 64, shown in FIG. 5, the inner space of the parison as well as the central bore 52 in the transfer mandrel is sealed off against atmosphere to allow the blowing medium to be supplied through a flexible tube 70. The tube 70 opens into the bore 72 through a lateral port provided in the piston 64.

As may be seen the piston 64 has a central bore 72 and the cylinder lid 73 has a central bore 74. This latter bore receives an expanding mandrel 75 which is sealed off from the cylinder space by means of seal rings 76 and 77. An expanding mandrel cylinder 78 is mounted on the lid 73 to actuate the expanding mandrel 75. The cylinder 78 may be of the telescopical type to allow for a two-step-motion of the expanding mandrel. Details of the telescopic cylinder 78 are shown in FIGS. 5A,B and C. The lower end of the expanding mandrel 75 is connected to an inner piston 780 sliding in a sleeve member 782 to which end portions 783,784 are secured this assembly defining a cylinder 781 which is provided with suitable working ports 785,786. The cylinder 781 further defines the outer piston which is slidingly mounted in cylinder 78 being provided with conduits 80,81. The mandrel 75 is shown in three positions. In FIG. 5A both the inner piston 780 and outer piston 781 are in a retracted position. According to FIG. 5B pressure applied through conduit 80 has fully raised outer piston 781 in its most elevated position while the inner piston 780 is held in the retracted position by pressurized air supplied through port 785. In FIG. 5C the air above piston 780 has been vented through port 785 and thus the pressure acting on piston 780 from below through port 786 raises the inner piston 780 to its extended position. The positions are referred to in the following description of the operation.

As the transfer mandrel 46 is delivered to the rotary member 13 with the piston 64 in its lower position and the forward end 79 of the expanding mandrel 75 being approximately at the height of the annular seal 67, the piston 64 is raised by supplying pressuring medium through 66 to sealingly contact the transfer mandrel urging the latter on the stop member 68 to axially fix the mandrel with respect to the blow mold. After lowering the bottom section 61 the blow mold sections 34,35 are closed, wherein the finish of the parison is firmly gripped by the insert sections of the blow mold sections. Then blowing medium is supplied to the conduit 70 and pressurized medium is fed into the expanding cylinder 78 through conduit 80. The gas displaced by moving the piston forward in the cylinder 78 passes through conduit 81, the adjustable throttle 82 and then vented into the atmosphere, thus allowing control of the speed of the expanding mandrel 75. The latter enters the parison through the central bore 52 of the transfer mandrel. Then the parison is axially expanded by the expanding mandrel 75 and is further expanded, preferably in a radial direction, by the blowing medium which enters the parison 40 through the annular space between the expanding mandrel and the piston 64 and the transfer mandrel 46 until the walls of the parison are blown in contact with the blow mold walls.

Preferably, the supply of pressurized medium to the cylinder provided to actuate the expanding mandrel is controlled by a rotary valve which is not shown. The valve allows the control of the air supply in response to the distance travelled or in response to time to control the motion of the expanding mandrel such that the forward end 79 just below the closed bottom of the parison when the blowing step is initiated to properly guide and expand the enlarging parison.

A further useful embodiment to move the expanding mandrel 75 results from the telescopic cylinder. Accordingly the expanding mandrel is raised up until shortly below the closed bottom of the parison in a first step raising the outer piston 781 to the position shown in FIG. 5B. By virtue of the telescopic type cylinder this end position is safely obtained despite varying air pressure and or friction.

During the second step of motion, in which the inner piston 780 is raised, the expanding mandrel follows closely the expanding parison until the second piston completes its stroke where the top of the mandrel reaches its most forward position as shown in FIG. 5C. The expanding force may be controlled by adjusting the pressure. The forward motion may be initiated by the program determined by the rotary valve not shown or by a valve controlled by the pressure of the blowing medium.

The supply of the blowing medium is controlled by three valves 85,86 and 87 which are mounted on a support 88 secured to the rotary blow member 13. Each blow mold station has a set of valves 85,86 and 87 which are actuated by cams 89,90 and 91 which cooperate with cam faces 92,93 and 94 which are fixedly mounted along the periphery of the blow member 13 in an adjustable and replacable manner.

Figure 6:
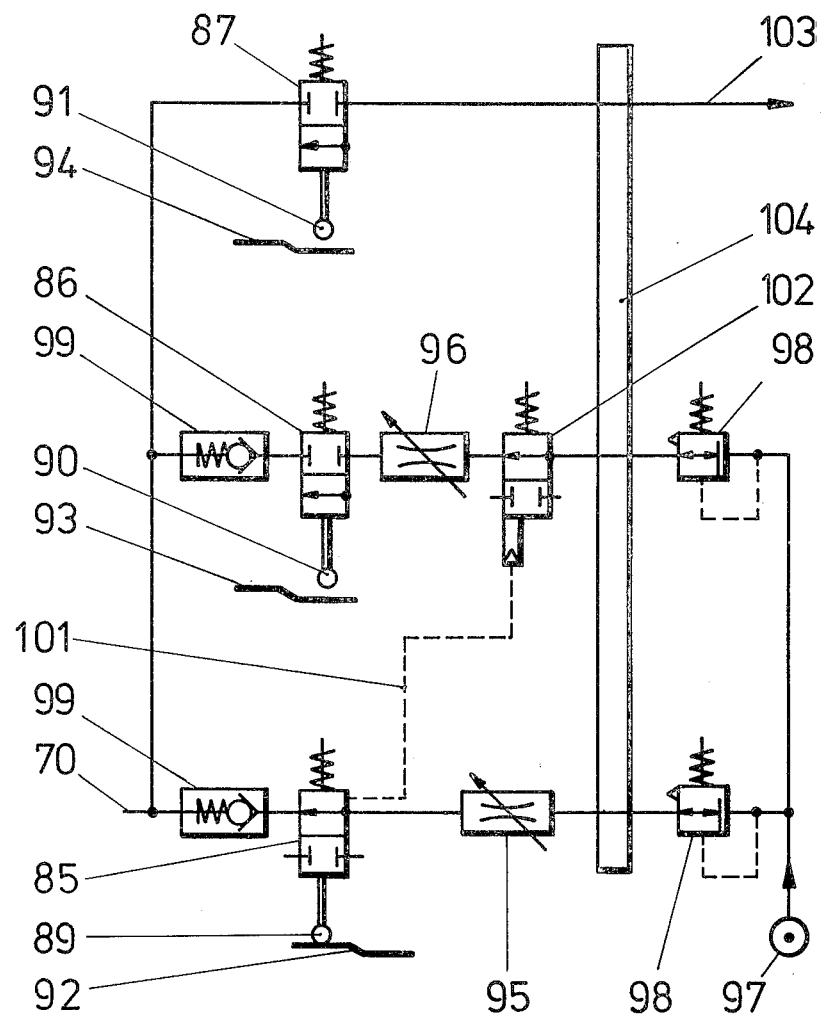
FIG. 6 is a schematic illustration for the control of the blowing medium, FIG. 6A a pressure-time diagram of the blowing process.

A schematic illustration of the blow medium control is shown in FIG. 6. The blow mold may be supplied with two different pressures through conduit 70, both pressures being adjustable preferably between 0 and 450 psi with the first lower blowing pressure being followed by a second higher pressure. Both valves 85 and 86 for the first and second blow pressure are connected via throttles 95 and 96 to a source of pressurized medium 97. The throttles are adjustable to control the amount of flow. Furthermore the first and second pressure is individually adjustable by means of the pressure reducing devices 98. The sequence and duration of the pressure supply is controlled by adjustment of the cam faces 92,93 and 94.

Figure 6A:
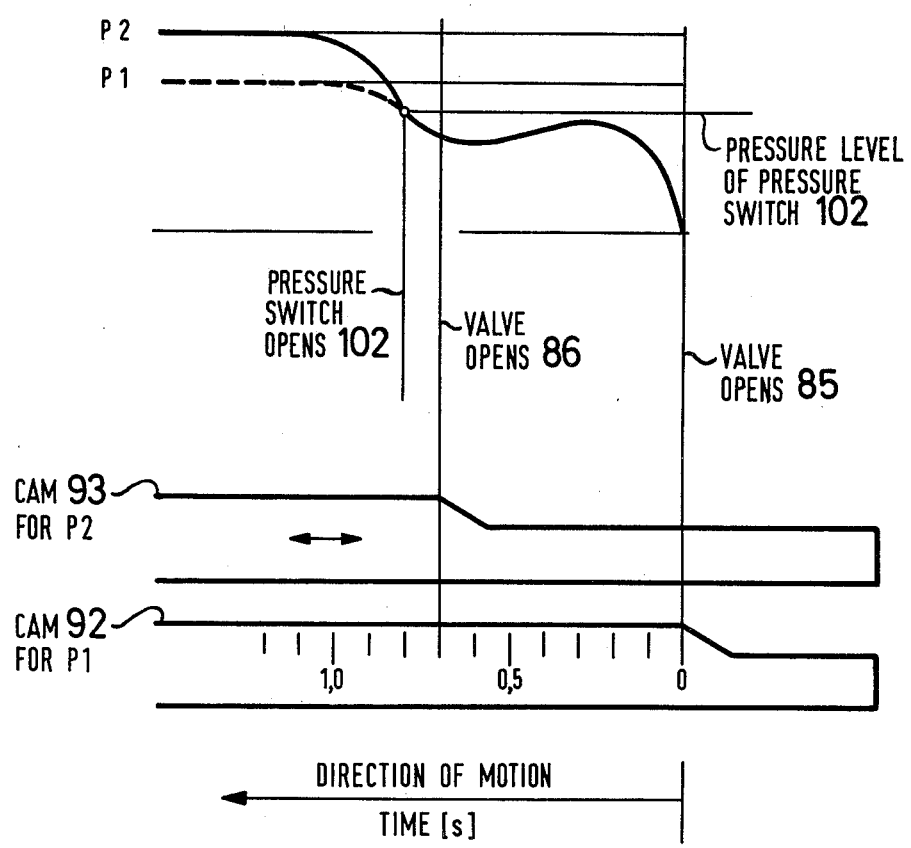

With the blow mold sections closed, the piston 64 is moved to the raised position to seal off the blowing pressure and the expanding mandrel 75, in the position shown in FIG. 5, having entered the parison, the raised section of cam face 92 opens the valve 85 to allow blowing medium of the first pressure to flow into the conduit 70. The build-up of the pressure in the parison is shown in FIG. 6A. Accordingly the parison is expanded by the first pressure P1 while at the same time being expanded by an axial forward motion of the expanding mandrel 75. As the volume of the expanding parison rapidly increases while the flow remains constant the internal pressure somewhat decreases after an initial sharp rise until the expanding step is almost completed. At this time the internal pressure raises again and the valve 86 is now opened as the cam 90 reaches the cam face 93. However, the pressure switch 102 is still closed until the internal pressure reaches a predetermined level which is secured in valve 85 and communicated via line 101 to the pressure switch 102 which is now opened so that the second pressure P2 is supplied into the blow mold to finally blow the parison walls onto the inner walls of the blow mold sections. Check valves 99 prevent the blowing medium from blowing off.

In case where the first blowing pressure cannot become active since a transfer mandrel having no parison thereon has been enclosed in the blow mold for example, the valve 85 keeps the pressure switch 102 closed since the predetermined pressure level cannot be reached. As the pressure switch is provided in the feed conduit to the second valve 86 the latter receives no pressure so that a large loss of air is prevented.

In an alternative manner the second blowing pressure may be supplied in response to the internal pressure of the bubble blown by the delivery of the first blowing pressure instead of initiating the second blowing pressure by a cam controlled valve as explained above.

After finishing the blowing step the venting valve 87 is opened by actuating the cam 91 upon reaching the cam face 94 so that the air still in the hollow article is vented through conduit 103. This conduit may be connected to a reservoir not shown which is for example maintained at the pressure level of the first blowing pressure so that the reservoir may be connected to the conduit connecting the source 97 to the first valve 85. As an example, as the blowing pressure in the blow mold is reduced to the level of the first blowing pressure, the valve 87 closes and the residual air still being in the article is vented through the annular space between the expanding mandrel 75 and the transfer mandrel 46 as soon as the piston 64 is downwardly displaced by the spring 69 after the supply of pressurized medium to the cylinder space 65 is terminated. At this time the expanding mandrel 75 leaves the transfer mandrel 46 at the lower end so that subsequently the transfer mandrel and the article seated upon the mandrel can be removed from the blow mold.

Figure 7:
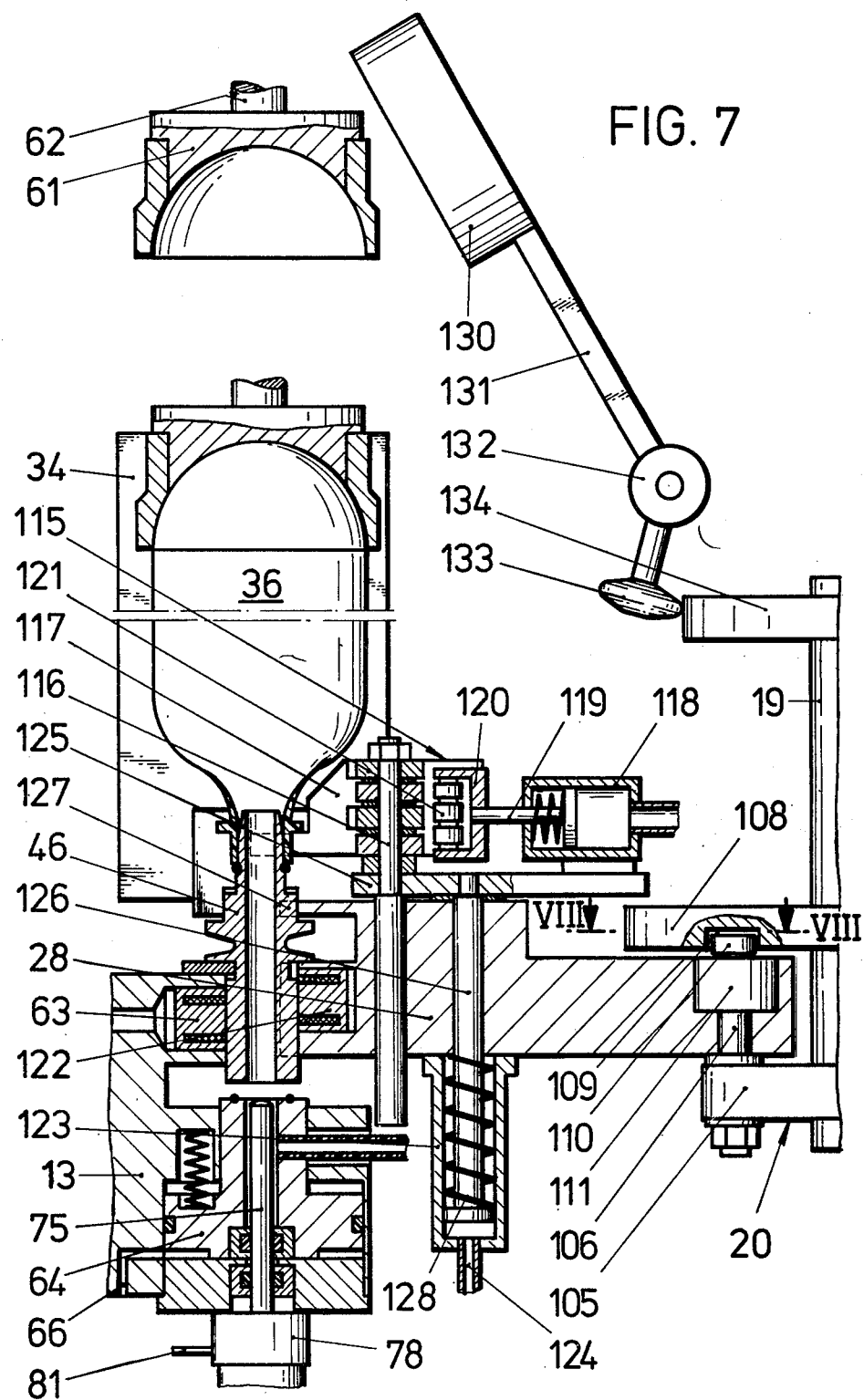
FIG. 7 is a section through the rotary output member portion facing a blow mold unit at the moment of removing a parison and a transfer mandrel out of the blow mold unit, FIGS. 7A,B are plane views of the gripping means in closed and open position.

Since the pressure source is arranged stationary, while the control means are mounted on the rotary blow member the connection therebetween is made by virtue of a rotary valve 104 in a manner known per se. FIG. 7 shows the removal of the articles, wherein the blow mold sections 34,35 are in their open position and the bottom section 61 in its raised position.

More particularly FIG. 7 shows a sectional view through the portion of the output member 20 facing the rotary blowing member 13 which output member is rotatably driven by the shaft 19 in a manner not shown in detail. The output member 20 comprises a disc 105 secured to the shaft 19, which disc carries the transfer arms 28 shown in FIG. 1. A pin 106 is provided for each transfer arm 28 which pin is secured to the disc 105, the transfer arm being pivotally mounted about the pin 106. There are eight arms 28 to remove the transfer mandrels from the blow member and to return the transfer mandrels to the heating member. A cam disc 108 is secured to the shaft 19 above the disc 105 which cam disc 108 is provided with an endless groove 109 which is engaged by a cam 110 which is rotatably secured to a projection 111 of the arm 28.

Figure 8:
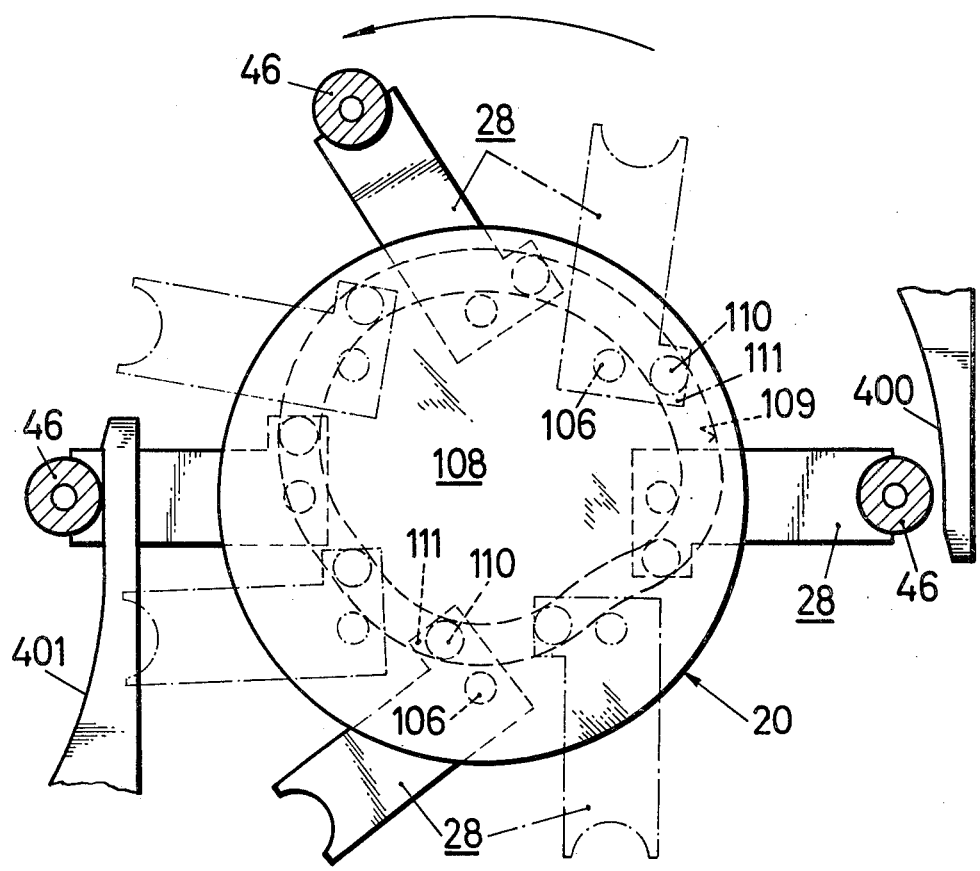
FIG. 8 is a plane view of the cam control for the pivotal arms of the rotary output member.

FIG. 8 shows a plan view of the output member 20 with eight arms 28 in their respective positions. As the disc 105 rotates, the pins 106 rotate in a circle, whereas the cams 110 run in the groove 109. Accordingly the rotary motion of the arms 28 resulting from the rotation of the disc 105 is superimposed by a pivotal motion about the pin 106 when the cam 110 travels in the groove 109. In this manner each arm 28 receives an accelerating or, respectively a decelerating speed. Speeding up is necessary to quickly remove the finished article seated upon the transfer mandrel through the gap between the opened blow mold sections when the arm is in the 3 o'clock position. The acceleration resulting in a leading motion of the arm 28 is utilized to return the transfer mandrel from the 3 o'clock via 12 o'clock to the 9 o'clock position where the mandrel after removing the article 36 is transferred to the rotary heating member along which periphery the distances of the transfer mandrels are substantially less than the peripheral distances of the blow mold devices. Subsequently the arm 28 is decelerated from the 9 o'clock through 6 o'clock position to be aligned with one of the blow mold devices. However, the arm is sped up again between the seven and eight o'clock position shortly before the particular blow mold device comes close. Cam faces 400 and 401 are provided at the respective transfer locations to separate the mandrel from the one magnet allowing the mandrel to be attracted by the opposite magnet.

Figures 7A, 7B:
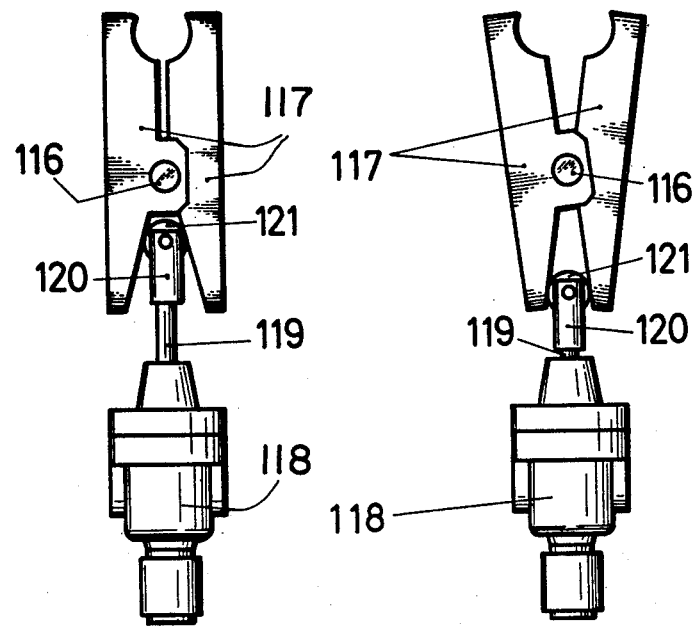

To remove the article 36 from the blow mold device 33 each arm 28 of the output member 20 is provided with a gripping means 115 comprising a pair of gripping jaws which can be pivoted about pin 116. FIG. 7 shows only one gripping jaw 117. The forward ends of the jaws grip the finish of the article 36 still being on the transfer mandrel 46. The opening and closing motion of the gripping jaws 117 is actuated by a small air pressure motor 118 of which the piston rod 119 carries a head 120 bearing cams 121 which engage between the jaws 117. Thus the piston rod 119 advancing and retracting the gripping means 115 are opened and closed. The closed position is shown in FIG. 7A and the opened position in FIG. 7B. A magnet 122 which is mounted at the forward end of the transfer arm 28 additionally keeps the transfer mandrel in position while being removed out of the blow mold device.

As soon as the article is removed, the blow mold cylinder 123 is supplied with pressurized medium through conduit 124 to raise the gripping means 115 which is mounted on a plate 125 secured atop of the piston rod 126, this motion resulting in drawing the article off the transfer mandrel 46. The transfer mandrel 46 is held in axial direction by the magnet 122 and a stop 127 and then returns at 37 (FIG. 1) to the rotary heating member 11.

Figure 9:
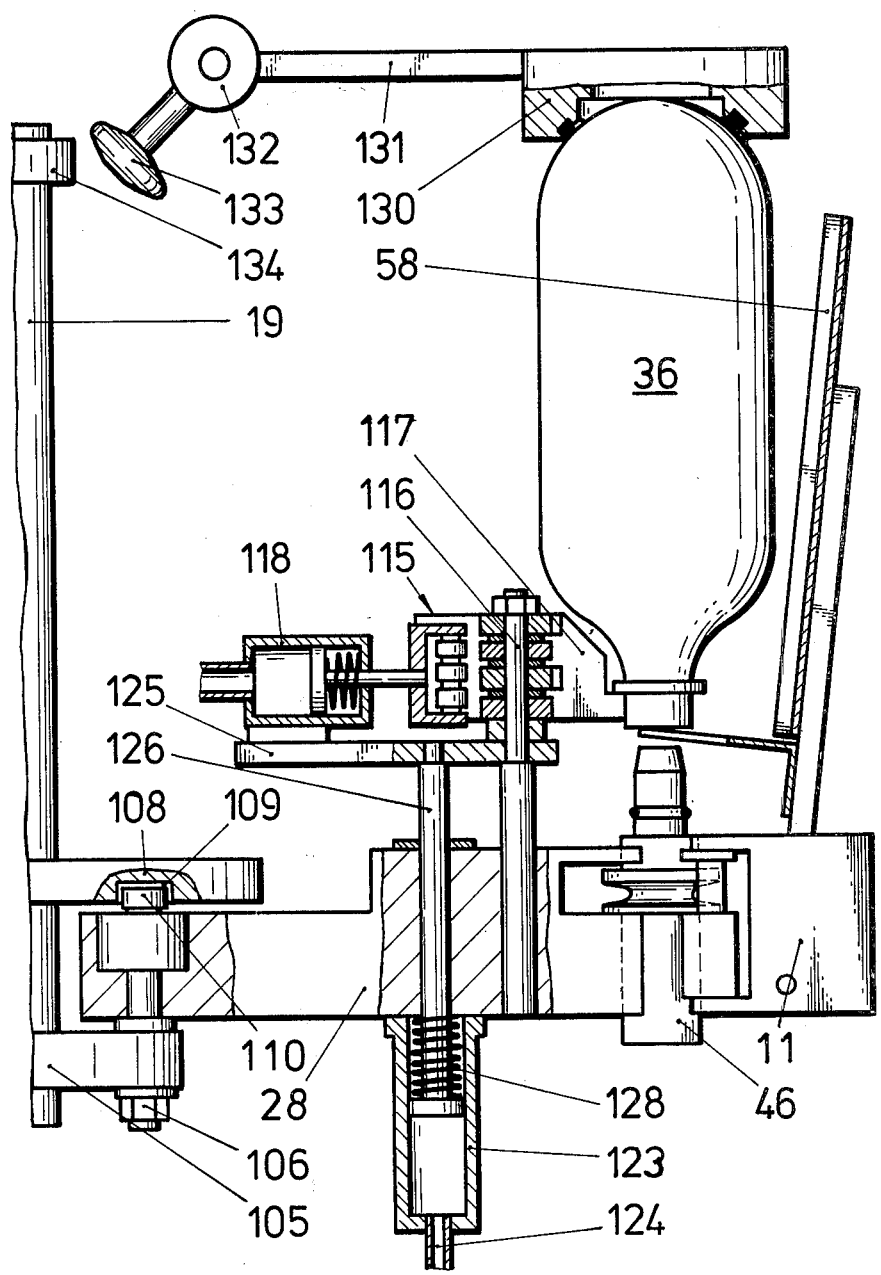
FIG. 9 is a section through a portion of the rotary output member facing the rotary heating member at the moment of returning a transfer mandrel to the rotary heating member.

FIG. 9 shows a section through the opposite portion of the output member 20 facing the heating member 11. In FIG. 9 the article 36 has been raised off the transfer mandrel and is still engaged by the gripping arms 117, whereas the transfer mandrel 46 is returned to the heating member 11. As shown the reflector 58 of the rotary heating member 11 is pivotally arranged to facilitate free passing of the article 36.

In this rotative position of the output member 20 a vacuum bell 130 one each provided for each transfer arm 28 has been lowered onto the bottom of the article 36 to engage the article when the gripping arms 117 of the gripping means 115 are opened in actuating the motor 118 after the transfer arm 28 is pivotally moved away from the rotary heating member. In this condition the article 36 is carried by the vacuum bell 130 and is conveyed to the output means 22 shown in FIG. 1. The vacuum bell 130 is secured to one end of a two-armed lever 131 which is pivotally supported at 132 and which other end 133 defining a cam runs along a cam disc 134 which is connected to the shaft 19. In this way the vacuum bell 130 shown in FIG. 7 in a lifted position with respect to the blowing member is lowered when the article is located adjacent the heating member to engage the bottom of the article and is then slightly raised in the further transfer towards the output conveyor 22 so that the article falls outwardly downward onto the output conveyor 22 after the vacuum is removed.

Upon opening the gripping arms 117 the gripping means 115 is lowered by venting the conduit 124 to atmosphere, whereby the spring 128 pushes the piston rod 126 downwardly. The gripping means 115 is now ready to engage a further article which arrives with a subsequent blow mold device 33.

However, in case of blowing defective article, for example a cracked or burst article the vacuum bell 130 lowered as shown in FIG. 9 is not able to attract the article 36 which falls into a waste basket 23 after opening the gripping arms 117 in a position between the heating member and the output conveyor 22.

In the embodiment shown the articles are designed to be adapted to withstand a high internal pressure having a bottom portion which is convex and may not stand upright. Therefore the article is provided with a standing flange. Mounting this flange may be incorporated into the operation of the output member 20. The mounting is schematically shown in FIG. 10.

After removing the article 36 still on the transfer mandrel 46 from the blow mold now opened, a vacuum bell 130 actuated by an air cylinder 136 is utilized to hold a standing flange 135. According to FIG. 10A the finished article 36 rides on the transfer mandrel 46. The vacuum bell 130 is in a lowered position, whereby the flange 135 is pushed onto the bottom of the article and is, for example, secured by a snapping engagement. In this condition the gripping arms 117 are opened and thus are out of engagement.

FIG. 10B shows that the article has been drawn off the transfer mandrel 46 by means of the vacuum bell 130 which has been lifted.

According to FIG. 10C the article is still engaged by the vacuum bell 130 and has been transferred within the reach of the output conveyor 22 where it is freed and removed via a chute 137. It is understood that the transfer mandrel 46 has been already returned to the rotary heating member.

Subsequently the vacuum bell 130 engages another standing flange 135 arriving on a conveyor 138 as shown in FIG. 10B, where upon the output member 20 rotates into a position in which another article 36 is taken from the rotary blowing member 13.

FIG. 11A shows a misshaped article 140 on a transfer mandrel 46 which article cannot be attracted by the vacuum bell 130 so that after closing the gripping means 117 the misshaped article 140 is drawn off the transfer mandrel 46 by means of the gripping arms 117 in their closed position as may be seen in FIGS. 11B and 11C.

According to FIG. 11D the misshaped article 140 is rejected into the waste container after opening the gripping arms 117 which then are moved into their lower position.

Now inventing the vacuum bell 130 to atmosphere the standing flange 135 becomes free. This is shown in FIG. 11E.

It should be apparent that the transfer mandrel 46 together with the parison 40 travels from the input station 25 at the rotary heating member 11 through the complete machine until being returned to the rotary heating member. The transfer mandrel thus merely serves to carry the parisons through the machine. After receiving a parison the transfer mandrel passing around with the rotary heating member is rotated axially by means of the cord drive passed the heating means. Since the transfer mandrel only engages the finish of the parison the transfer mandrel does not provide for an obstacle for a free passing of the infra-red radiation. The transfer mandrels spaced in close relationship at the periphery of the rotary heating member are transferred by the transfer wheel into the blow molds which are located in large peripheral distances of the rotary blowing member. The expanding means to guide and axially expand the parison is a component of each blow mold. Due to this structure the shape of each transfer mandrel is greatly simplified. A further advantage results from the feature that the blowing pressure and the blowing time may be controlled externally through valves which are actuated by cam means. Separating the article from the transfer mandrel takes place in a third rotary member i.e. the output wheel 20 which means that all transfer mandrels are returned to the rotary heating member despite the fact whether the article has been properly blown or became misshaped in blowing. Further the output member may be utilized to mount a standing flange onto the finished article bottom.

What is claimed is:

1. An apparatus for making hollow articles, in particular bottles from a plurality of parisons of thermoplastic material having a cavity, said apparatus comprising:

a base frame;

a first rotary member rotatably mounted to said base frame;

first support means mounted to the periphery of said first rotary member for rotatably supporting said plurality of parisons;

a plurality of transfer mandrels interposed said first support means and said plurality of parisons, each of said plurality of mandrels having an end portion adapted to receive one of said plurality of parisons, each end portion including seal means for sealing internally of said one of said plurality of parisons, each of said plurality of mandrels further having an opposite end portion and a central bore therethrough, said opposite end portion of each of said mandrels terminating in a gripping portion adapted to communicate with said first support means for a predetermined rotatable movement with said first rotary member;

means for heating said plurality of parisons, said heating means fixed to said base frame and surrounding the periphery of the first rotary member for a predetermined sector, said first rotary member rotably moving said plurality of mandrels and parisons mounted thereon past said means for heating such that said plurality of parisons are heated, each of said plurality of parisons further having a central axis parallel to the central axis of said first rotary member when passing through said predetermined sector;

a second rotary member mounted to said base frame in spaced relationship to said first rotary member, said second rotary member comprising:

an axis of rotation parallel to the axis of rotation of said first rotary member;

second support means mounted to the periphery of said second rotary member to support said plurality of transfer mandrels and parisons;

blow mold means having a plurality of multiple-part blow molds, each of said blow molds radially extending from said central axis of the second rotary member for carrying each of said plurality of said transfer mandrels; and a plurality of movable expanding mandrel means mounted to said second rotary member for movement therewith, each of said plurality of movable expanding mandrels means having seal means for sealing against each of said plurality of transfer mandrels carried by said plurality of blow mold means, said movable expanding mandrel means each further having a stretching member with a central axis axially aligned with the central axis of the central bore of each of said plurality of transfer mandrels carried by said plurality of blow mold means, said stretching member further being extendable through the central bore of each of said plurality of transfer mandrels into said cavity of each of the plurality of parisons, said stretching member and cavity of each of said parisons defining a space to deliver a blow medium into the cavity of each the parisons;

means for transferring said plurality of transfer mandrels from said first rotary member to said second rotary member;

means for blowing a fluid medium into said space surrounding said stretching member such that each of said plurality of parisons cooperate with each of said plurality of multiple-part blow molds to provide a finished article blown in each of said blow molds;

rotary output means mounted adjacent said plurality of blow mold means for remaining said finished articles from said plurality of blow mold means and further removing said finished articles from said plurality of mandrels; and input means mounted in spaced relationship to said first rotary member for receiving a plurality of parisons and transferring each of said plurality of parisons to one of said plurality of transfer mandrels respectively as said plurality of transfer mandrels are rotated about the periphery of said first rotary member.

2. The apparatus of claim 1, wherein the space between each of said plurality of expanding mandrels and the central bore of each of said plurality of transfer mandrels is provided to be connected to a source of blowing medium and wherein the annular space is sealed off by a piston sealingly engaging each of said plurality of transfer mandrels, said piston sealingly guiding said each of said plurality of expanding mandrels.

3. The apparatus as claimed in claim 1, wherein said means for blowing a fluid media into said space further comprising:
- a plurality of valves mounted to said second rotary member for controlling blowing fluid medium; and
- a plurality of cam faces fixedly mounted in spaced relationship to said plurality of valves, such that said cam faces cooperate with said plurality of valves respectively to control the actuating position of said plurality of valves.

4. The apparatus of claim 3 wherein said plurality of cam faces are adjustably mounted to control the blowing time.

5. The apparatus as claimed in claim 3 wherein each of said plurality of valves is provided for a different blowing pressure.

6. The apparatus as claimed in claim 3 wherein said plurality of movable expanding mandrel means further comprises a plurality of expanding cylinders each of said plurality of expanding cylinders being axially aligned with said stretching member of each of said plurality of movable expanding mandrel means, each of said plurality of cylinders cooperating with said stretching member to actuate each of said expanding mandrels respectively such that when each of said plurality of cylinders are connected to a source of air by one of said plurality of valves, each of said plurality of cylinders actuate one of said plurality of expanding mandrels respectively to axially displace said parison with said blow mold means.

7. The apparatus as claimed in claim 6 wherein each of said plurality of expanding cylinders is comprised of a telescoping cylinder and wherein further said stretching member travels a predetermined distance equal to two full strokes of said telescoping cylinder.

8. The apparatus as claimed in claim 3 wherein said means for blowing a fluid media into said space further comprises:
- a first predetermined blowing pressure source in communication with one of said plurality of valves and said space in the parison for a predetermined time; and
- a second predetermined blowing pressure source communication with the space in said parison in response to a predetermined minimum internal pressure in the parison.

9. The apparatus as claimed in claim 8 further including means for controlling the internal pressure of said space in the parison to a predetermined amount such that the entry of the first predetermined blowing pressure entering said space shapes said parison to a predetermined optimum shape.

10. The apparatus as claimed in claim 3 wherein one of said plurality of valves is controlled by one of said plurality of cam faces such that the space in said parison is vented; and further including a reservoir mounted to said base frame for regaining pressurized medium at a reduced pressure level from said second predetermined blowing pressure.

11. The apparatus as claimed in claim 1 wherein said plurality of expanding mandrel means have a predetermined stroke, said predetermined stroke being a function of the blowing pressure and blowing time.

12. The apparatus as claimed in claim 1 wherein said one end of each of said plurality of transfer mandrels further comprises:
- a body having a first shoulder portion;
- a tapered end portion adjacent said body for receiving said parison;
- said means for sealing said central cavity of said parison mounted on said one end, said sealing means interposed said body portion and said tapered end portion;
- a groove around the periphery of said one end of each of said plurality of mandrels adapted to receive a cord drive for rotating engagement therewith, such that each of said plurality of mandrels rotate about its rotating axis through said predetermined sector to heat said parison to a blowable temperature.

13. The apparatus as claimed in claim 1 wherein said opposite end portion of each of said plurality of transfer mandrels further comprises a second shoulder portion adjacent said gripping portion for axially aligning each of said mandrels with respect to each of said multiple-part blow mold means.

* * * * *

UNITED STATES PATENT AND TRADEMARK OFFICE
CERTIFICATE OF CORRECTION

PATENT NO. : 4,214,860
DATED : July 29, 1980
INVENTOR(S) : Gunter Kleimenhagen et al.

It is certified that error appears in the above—identified patent and that said Letters Patent is hereby corrected as shown below:

Column 9, line 23, after the numeral "79" insert ----is----.

Column 16, line 2, delete the word "communication" and insert ----communicating----.

Signed and Sealed this

Eighteenth Day of November 1980

[SEAL]

Attest:

Attesting Officer

SIDNEY A. DIAMOND

Commissioner of Patents and Trademarks

UNITED STATES PATENT OFFICE
CERTIFICATE OF CORRECTION

Patent No. 4,214,860          Dated July 29, 1980

Inventor(s) Gunter Kleimenhagen et al

It is certified that error appears in the above-identified patent and that said Letters Patent are hereby corrected as shown below:

On the cover page, under the title "Foreign Application Priority Date" delete the date "Sep. 6, 1978" and insert therefore ----Sept. 22, 1977----.

Signed and Sealed this

Thirteenth Day of January 1981

[SEAL]

Attest:

Attesting Officer

SIDNEY A. DIAMOND

Commissioner of Patents and Trademarks